March 8, 1960 W. H. COBLENTZ ET AL 2,927,369
METHOD OF MAKING MULTIPLE PASSAGE HEAT EXCHANGER
Filed Oct. 21, 1954
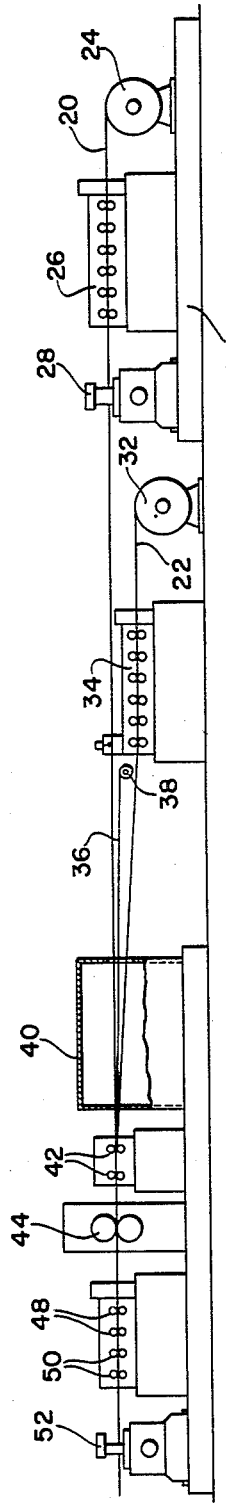
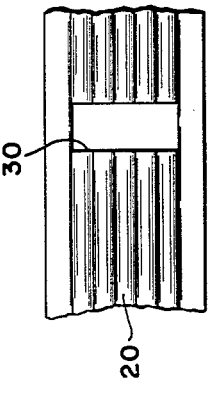
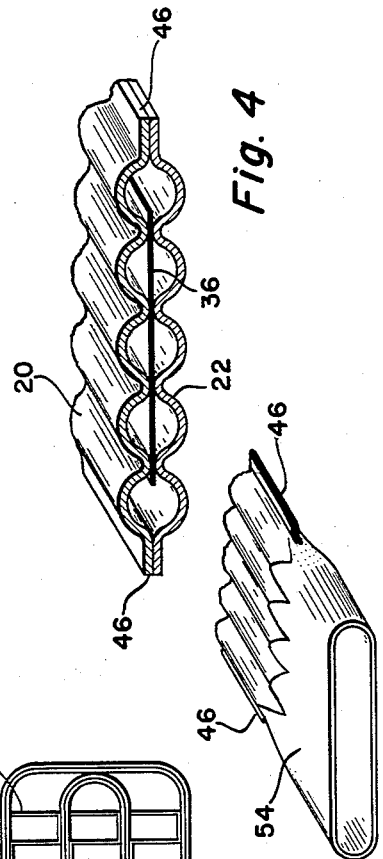
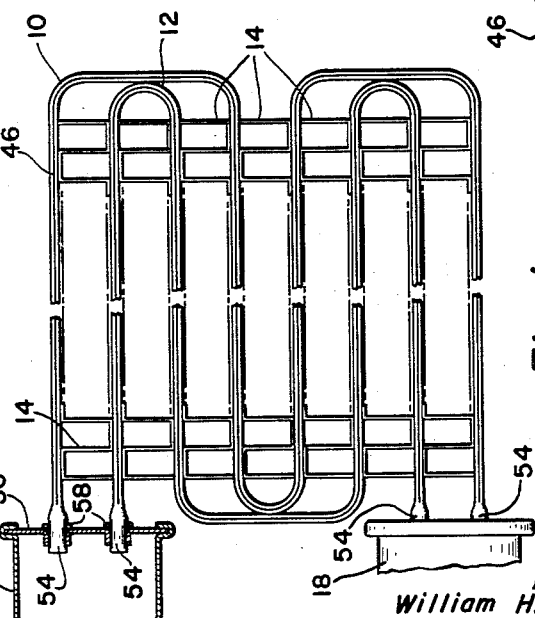
INVENTOR.
William H. Coblentz
Donald W. Scott
BY R. R. Candor
His Attorney United States Patent Office 2,927,369
Patented Mar. 8, 1960

2,927,369

METHOD OF MAKING MULTIPLE PASSAGE HEAT EXCHANGER

William H. Coblentz and Donald W. Scott, Dayton, Ohio, assignors to General Motors Corporation, Detroit, Mich., a corporation of Delaware Application October 21, 1954, Serial No. 463,696

1 Claim. (Cl. 29—157.3)

This invention relates to refrigerating apparatus and more particularly to a heat exchanger and to the method of manufacturing the same.

It is an object of this invention to reduce the cost of manufacturing high pressure condensers and the like.

Another object of this invention is to reduce the number of brazed joints in a heat exchange unit so as to minimize the possibility of leaks.

Still another object of this invention is to provide an improved method of manufacturing a multiple passage tube so as to provide a common manifold connection serving the individual passages.

Still another object of this invention is to provide an improved arrangement for manufacturing a heat exchanger in which the fins and all of the component parts of the heat exchanger are simultaneously brazed to one another.

Still another object of this invention is to provide a multiple passage tubing in which the walls of the outer passages are provided with flanges which assist in preventing collapse of the tubing during subsequent bending operations.

Further objects and advantages of the present invention will be apparent from the following description, reference being had to the accompanying drawings, wherein a preferred form of the present invention is clearly shown.

In the drawings:

Figure 1 is an elevational view with parts broken away showing a heat exchanger constructed in accordance with the invention;

Figure 2 is a side elevational view with parts broken away showing somewhat diagrammatically the machine used in manufacturing heat exchangers made according to the invention;

Figure 3 is a fragmentary plan view of one of the strips used in making the tubing;

Figure 4 is a fragmentary perspective view showing a cut away section of the tubing prior to the brazing operation; and, Figure 5 is a fragmentary perspective view showing the swaged end of the tubing prior to insertion in the manifold and prior to the brazing operation.

Referring now to the drawing wherein a preferred embodiment of the invention has been shown, reference numerals 10 and 12 designate substantially parallel sections of multiple passage tubing which have been bent into serpentine shape and assembled with fins 14 and headers 16 and 18 in the manner shown. The corrugated fin sections 14 are made by forming corrugations in narrow strips of metal and cutting the corrugated strip into lengths suitable for insertion between the straight portions of the tubing. After forming the tubing into the desired serpentine shape the fins are placed between the straight portions of the tubing and these fins are then brazed to the side walls of the tubing in the same operation in which other parts of the heat exchanger are brazed to one another. The usual inlet header 16 is provided through which a fluid may be introduced into the passages formed in the tubing sections 10 and 12. Reference numeral 18 designates the outlet header which is similar in construction to the inlet header 16.

Generally speaking, the multiple passage tubing used in manufacturing the heat exchanger is made from a pair of ribbon-like strips 20 and 22 which are fed into a special forming machine such as the machine generally designated by the reference numeral 23 in Figure 2. The upper metal strip 20 is fed from a supply roll 24 into a first bank of forming rolls designated by the reference numeral 26 which progressively form corrugations in the strip 20. As best shown in Figures 3 and 4 the rollers leave flat portions on opposite sides of the corrugations for a purpose to be described more fully hereinafter. As the corrugated strip 20 leaves the rollers 26 it passes through a punching device 28 which at given intervals punches slots 30 which extend across the corrugated portions of the strip only, such as shown in Figure 3. The bottom strip 22 which is fed into the machine from the supply roll 32 passes through a bank of forming rollers 34 which serve to progressively form corrugations in the strip 22 which are complementary to the corrugations in the strip 20.

A thin strip of brazing material 36 which is fed from a supply roll 38 is inserted between the strips 20 and 22 so as to provide the necessary amount of brazing material for use in brazing the meeting surfaces of the corrugations together. Reference numeral 40 designates a cleaning device which serves to steam the strips 20, 22 and 36 and then dry them before passing through a set of feed rollers 42. After passing through the feed rollers 42 the strips are passed between electric welding rollers 44 which serve to weld the opposite edges only of the strips together as indicated at 46 in Figures 4 and 5. Reference numeral 48 designates pull-through rollers which serve to pull the strips through the welding rollers 44.

Reference numeral 50 designates slitting rollers which trim the edges of the overlapping portions of the resulting side flanges. The amount of material removed by the slitting rollers is only enough to remove the extreme outer edges of the flanges as the extreme outer edges may not be fully welded to one another. After passing through the slitting rolls, the strips which are now welded together adjacent their edges so as to form tubing are passed through a cut-off machine 52 which cuts the tubing into the desired lengths. The cut-off machine 52 serves to completely sever the strips at the points where the slots 30 have previously been provided in the upper strip 20. By virtue of having cut the slots 30 in the upper strips 20 before the strip was assembled to the strip 22 it is possible to perform the cutting without crushing the corrugations.

After the tube sections have been cut to length but before the tubing has been brazed, the end sections of the corrugated tubing are spread and swaged so as to form the shape shown at 54 in Figure 5. The ends 54 are then inserted into the header plates 56 as shown in Figure 1. Brazing material 58 is then placed adjacent the juncture of the tubing and the header plates so that when the assembly is placed into a brazing furnace the joints between the tubing and the headers will be brazed at the same time that the brazing strips 36 will be melted so as to braze the meeting surfaces of the corrugated sheets to one another. The brazing material 36 serves to completely seal the adjacent passages in the tubing from one another.

While the form of embodiment of the invention as herein disclosed constitutes a preferred form, it is to be understood that other forms might be adopted, as may come within the scope of the claim which follows.

What is claimed is as follows:

The method of forming multiple passage heat exchange units having serpentine passages formed between two continuous strips of metal which comprises forming upwardly and longitudinally extending corrugations in the mid portion of a first metal strip, forming complementary downwardly and longitudinally extending corrugations in the mid portion of a second metal strip, inserting bonding material between said strips, thereafter welding the edges of the strips together with the corrugations in the adjacent strips arranged in alignment with one another, forming one or more bends in the strip and thereafter heating the assembly to a temperature high enough to fuse said bonding material so as to bond the corrugated portions of said strips together at the points where the corrugations contact one another whereby a plurality of parallel passages are formed between said strips and whereby the stress within the strip material which is produced during the bending of the strip is relieved by said heating operation.

References Cited in the file of this patent

UNITED STATES PATENTS

| | | |
|---|---|---|
| 1,391,871 | Volk | Sept. 27, 1921 |
| 1,950,500 | Loprich et al. | Mar. 13, 1934 |
| 2,011,854 | Emmons et al. | Aug. 20, 1935 |
| 2,012,582 | Slagel | Aug. 27, 1935 |
| 2,063,757 | Saunders | Dec. 8, 1936 |
| 2,158,383 | Saunders | May 16, 1939 |
| 2,164,005 | Booth | June 27, 1939 |
| 2,514,469 | Burkhardt | July 11, 1950 |
| 2,746,139 | Van Pappelendam | May 22, 1956 |
| 2,757,628 | Johnston | Aug. 6, 1956 |